United States Patent
Tsai et al.

(10) Patent No.: US 6,592,484 B1
(45) Date of Patent: Jul. 15, 2003

(54) TRANSMISSION GEARBOX FOR PARALLEL HYBRID ELECTRIC VEHICLES

(75) Inventors: Lung-Wen Tsai, Potomac, MD (US); Gregory A. Schultz, 4207 Rock Run Rd., Havre de Grace, MD (US) 21078

(73) Assignees: Gregory A. Schultz, Havre de Grace, MD (US); Lung-Chu Tsai, Riverside, CA (US); David Holloway, Brinklow, MD (US)

( * ) Notice: Subject to any disclaimer, the term of this patent is extended or adjusted under 35 U.S.C. 154(b) by 0 days.

(21) Appl. No.: 09/635,315

(22) Filed: Aug. 9, 2000

Related U.S. Application Data

(60) Provisional application No. 60/188,622, filed on Mar. 13, 2000, provisional application No. 60/148,826, filed on Aug. 13, 1999, and provisional application No. 60/147,915, filed on Aug. 9, 1999.

(51) Int. Cl.[7] .................................................. R16H 3/72
(52) U.S. Cl. ........................................................ 475/5
(58) Field of Search .................. 475/5, 8; 180/65.2, 180/65.3, 65.4, 65.6, 65.7

(56) References Cited

U.S. PATENT DOCUMENTS

| | | | |
|---|---|---|---|
| 3,566,717 A | | 3/1971 | Berman et al. |
| 3,623,568 A | | 11/1971 | Mori |
| 3,732,751 A | | 5/1973 | Berman et al. |
| 3,861,484 A | | 1/1975 | Joslin |
| 5,285,111 A | | 2/1994 | Sherman |
| 5,337,848 A | * | 8/1994 | Bader ........................ 477/5 X |
| 5,343,970 A | | 9/1994 | Severinsky |
| 5,433,282 A | | 7/1995 | Moroto et al. |
| 5,492,189 A | | 2/1996 | Kriegler et al. |
| 5,558,173 A | | 9/1996 | Sherman |
| 5,558,175 A | | 9/1996 | Sherman |
| 5,558,588 A | | 9/1996 | Schmidt |
| 5,558,589 A | | 9/1996 | Schmidt |
| 5,558,595 A | | 9/1996 | Schmidt et al. |
| 5,571,058 A | | 11/1996 | Schmidt |
| 5,577,973 A | | 11/1996 | Schmidt |
| 5,643,119 A | | 7/1997 | Yamaguchi et al. |
| 5,713,425 A | * | 2/1998 | Buschhause et al. ....... 180/65.2 |
| 5,730,675 A | | 3/1998 | Yamaguchi |
| 5,730,676 A | | 3/1998 | Schmidt |
| 5,789,823 A | | 8/1998 | Sherman |
| 5,846,155 A | | 12/1998 | Taniguchi et al. |
| 5,911,642 A | | 6/1999 | Andres et al. |
| 5,931,757 A | | 8/1999 | Schmidt |
| 5,935,035 A | | 8/1999 | Schmidt |
| 5,984,034 A | * | 11/1999 | Morisawa et al. ......... 180/65.2 |
| 6,010,422 A | | 1/2000 | Garnett et al. |
| 6,024,182 A | * | 2/2000 | Hamada et al. ........ 180/65.2 X |
| 6,090,005 A | | 7/2000 | Schmidt et al. |
| 6,258,006 B1 | * | 7/2001 | Hany et al. ................. 475/5 X |

* cited by examiner

*Primary Examiner*—Sherry Estremsky
*Assistant Examiner*—Roger Pang
(74) *Attorney, Agent, or Firm*—Whiteford, Taylor & Preston LLP; Gregory M. Stone; Jeffrey C. Maynard

(57) ABSTRACT

Disclosed is a novel parallel hybrid transmission that transmits torque from two power sources to the drive wheels of a vehicle. The transmission functions with a single heat engine and a single electric motor/generator. Through the use of a compound planetary gear train and four automatically controlled clutches, the transmission is able to (i) sum torque from the two power sources to drive the vehicle; (ii) split torque from the heat engine to drive the vehicle and charge the batteries; (iii) transmit torque individually from either of the two power sources; and (iv) operate as a one- or two-degree-of-freedom mechanism. The configuration of clutches and the compound planetary gear train enable thirteen modes of operation, namely, one motor-only mode, three combined motor and engine modes, one continuous variable transmission/charging mode, four engine-only modes, and four regenerative braking modes. Because the design is based on conventional automatic transmission components, the design is simple, compact, efficient, and reliable.

47 Claims, 13 Drawing Sheets

(a) Schematic diagram.

(a) Schematic diagram.

(a) Schematic diagram.

TRANSMISSION GEARBOX FOR PARALLEL HYBRID ELECTRIC VEHICLES

CROSS-REFERENCE TO RELATED APPLICATIONS

The present application is based upon and gains priority from U.S. Provisional Patent Application Ser. No. 60/147,915 filed Aug. 9, 1999 by one of the inventors herein and entitled "A Transmission Gearbox for Parallel Hybrid Electric Vehicles"; and is also based upon and gains priority from U.S. Provisional Application Ser. No. 60/148,826, filed Aug. 13, 1999 by one of the inventors herein and entitled "A Transmission Gearbox for Parallel Hybrid Electric Vehicles"; and is likewise also based upon and gains priority from U.S. Provisional Application Ser. No. 60/188,622, filed Mar. 13, 2000, entitled "A Transmission Gearbox for Parallel Hybrid Electric Vehicles."

BACKGROUND OF THE INVENTION

1. Field of the invention

The invention disclosed herein relates generally to parallel hybrid electric vehicle (HEV) transmissions, and more particularly to parallel hybrid electric vehicle transmissions capable of providing one- or two-degree-of-freedom operation in order to couple and transmit torque from two power sources to the drive wheels of the automobile, or to split the torque from one power source into two parts, one for driving the automobile and the other for charging the vehicle batteries.

2. Description of the Background

Internal combustion engines are widely used for driving passenger cars. Typically, the size of an engine used in a vehicle is several times greater than the average power requirement of the vehicle in order to meet various operating conditions. As a result, the engine cannot run at its optimal operating condition most of the time which leads to poor fuel economy and emissions. This problem is particularly important in large cities where stop-and-go driving is common and pollution is a major problem.

One approach to reduce pollutants is to utilize electric vehicles. In an electric vehicle, an electric motor derives its power from a battery pack to drive the vehicle. The batteries are charged by an external power source when the vehicle is off duty. However, electric vehicles suffer the problems of limited driving range, typically around 200 miles, insufficient acceleration and hill climbing performance, and prolonged battery charging time.

Another approach is to employ hybrid vehicles. There are two types of hybrid vehicles, namely, series hybrid and parallel hybrid. In a series hybrid, an electric motor converts chemical energy stored in a battery pack into mechanical power to drive the vehicle whereas an engine is used to drive a generator for charging the batteries. Power is transmitted from the engine to the electric generator, the battery pack, and the electric motor, and then to the wheels. This arrangement permits the engine to run near its optimal operating condition on demand. Hence, the problems of limited driving range and prolonged battery charging time can be avoided. In a parallel hybrid, two or more power sources such as an engine and an electric motor are used to drive the vehicle simultaneously. Through the use of a non-conventional transmission and an electronic control unit, the electric motor can sometimes be converted into a generator for charging the batteries. In this regard, a parallel hybrid provides a more direct transfer of energy from the engine to the driving wheels. In addition, the size of the electric motor can be much smaller than that of a series hybrid, and there is no need for a separate generator. Hence, a parallel hybrid is more efficient and more economical than a series hybrid.

Attempts have been made in the past to provide parallel hybrid electric vehicle transmissions, but with limited success. For example, U.S. Pat. No. 5,577,973 to Schmidt describes a two-degree-of-freedom hybrid transmission in which a compound planetary gear set having two planetary gear subsets is provided, with two gear members of each subset being conjoined with two gear members of the opposing subset. This arrangement allows the electric motor to supplement the torque supplied by the heat engine to enable a two-degree-of-freedom transmission, but fails to enable engine-only or motor-only operation, thus limiting the utility of the transmission to one having two modes of forward driving operation.

Likewise, U.S. Pat. No. 5,558,175 to Sherman describes a hybrid transmission comprising two compound planetary gear train arrangements, one for combining torque outputs from an internal combustion engine with the torque outputs from an electric motor, and the other for providing a multi-range transmission capability. Thus, the Sherman '175 system requires two separate planetary gear train assemblies in order to accomplish the combined functions of torque combination with multi-speed capability.

It would therefore be advantageous to provide a hybrid electric vehicle transmission which combines the features of torque combination from a heat engine and electric motor and multi-speed capability in a single compound planetary gear train assembly, while enabling combined engine and motor operation, engine-only operation, or motor-only operation as the need arises to meet varying torque and engine efficiency requirements.

SUMMARY OF THE INVENTION

It is, therefore, an object of the present invention to provide a parallel hybrid transmission which avoids the disadvantages of the prior art.

It is another object of the present invention to provide a parallel hybrid transmission having the ability to sum torque from two power sources and transmit the combined torque to the vehicle wheels.

It is another object of the present invention to provide a parallel hybrid transmission operable by a single heat engine and a single electric motor.

It is yet another object of the present invention to provide a parallel hybrid transmission that enables selective operation of engine-only, motor-only, and combined engine and motor torque transmission to an output shaft.

It is yet another object of the present invention to provide a parallel hybrid transmission having the ability to split torque from a heat engine such that a portion of the torque derived from the heat engine is used to power a generator that charges the vehicle batteries, while the remaining portion of the torque derived from the heat engine is transmitted to the vehicle wheels.

It is still yet another object of the present invention to provide a parallel hybrid transmission having the ability to operate two power sources individually, and to control such power sources independently from one another.

It is still even yet another object of the present invention to provide a parallel hybrid transmission having the ability to operate as a continuous variable transmission.

It is still yet another object of the present invention to provide a parallel hybrid transmission having regenerative braking capability.

It is even yet another object of the present invention to provide a parallel hybrid transmission exhibiting small mechanical and electrical losses.

It is still even yet another object of the present invention to provide a parallel hybrid transmission of reliable and simplified design over prior art transmissions.

In accordance with the above objects, a novel parallel hybrid transmission is provided comprising a compound planetary gear set, an engine, an engine input shaft, a combined electric motor and generator assembly, a motor input shaft, an output shaft, and four torque transfer devices. In a preferred embodiment of the invention, the four torque transfer devices comprise two multi-disk clutches and two band clutches. The compound planetary gear set comprises two planetary gear trains that conjoin two gear members from each gear train. In a preferred embodiment of the invention, the two planetary gear trains share a compound sun gear and conjoin the ring gear of the input planetary gear train with the planet carrier of the output planetary gear train. Through the use of the torque transfer devices, the engine input shaft and the motor input shaft may be selectively coupled to various members of the compound planetary gear set in order to provide 13 operational modes, namely: an electric motor driving mode for moving the vehicle from a standstill and for low speed driving in city traffic; three power modes which combine the torque provided from the engine and the motor; a continuous variable transmission/charging mode which uses power from the engine to simultaneously drive the vehicle and charge the batteries while enabling continuous variable transmission through regulation of the speed of the generator; four engine modes which power the vehicle directly from the heat engine with no power assist from the motor for use in highway cruising conditions; and four regenerative modes experienced during vehicle braking in which the electric motor is operated as a generator to charge the batteries.

Thus, the combination of the torque transfer devices and compound planetary gear train of the instant invention provide increased versatility of a hybrid vehicle transmission over prior art hybrid vehicle transmissions, while maintaining a simplified, reliable transmission construction operable through engine-only, motor-only, and combined engine and motor torque transmission to the transmission output shaft.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
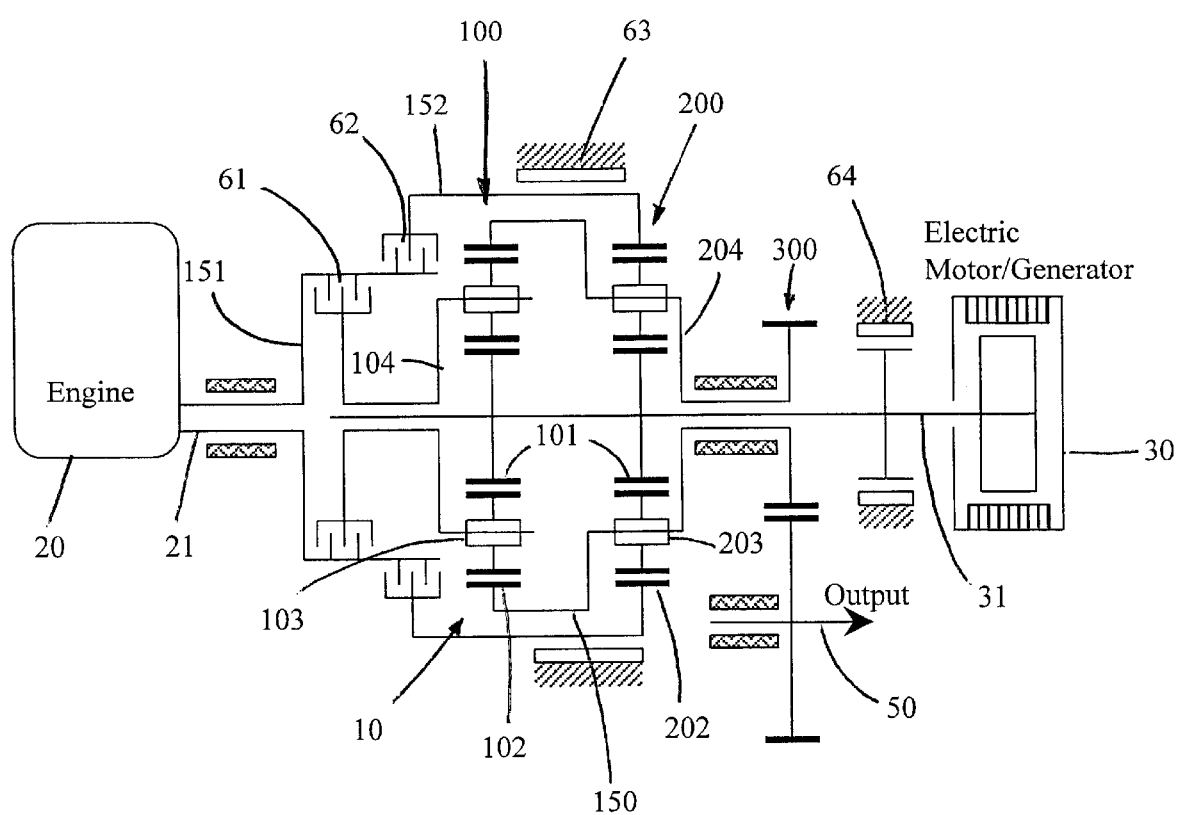
FIG. 1 is a schematic representation of parallel hybrid electric vehicle transmission of the instant invention.

As shown in the schematic representation of FIG. 1, the parallel hybrid electric vehicle transmission of the instant invention comprises a compound planetary gear set (shown generally at 10), an engine 20, an engine input shaft 21, a combined electric motor and generator 30, a motor input shaft 31, an output shaft 50, and four torque transfer devices 61, 62, 63, and 64. Torque transfer devices 61 and 62 preferably comprise multi-disk clutches, and torque transfer devices 63 and 64 preferably comprise band clutches. However, other similarly configured torque transfer devices, such as one-way clutches, may likewise be used without departing from the spirit and scope of the instant invention.

Compound planetary gear set 10 more particularly comprises an input planetary gear train (shown generally at 100) and an output planetary gear train (shown generally at 200). Each of planetary gear trains 100 and 200 share a compound sun gear 101. Input planetary gear train 100 further comprises a ring gear 102 and a plurality of planetary gears 103. Likewise, output planetary gear train 200 further comprises a ring gear 202 and a plurality of planetary gears 203. A hub 150 interconnects ring gear 102 of input planetary gear train 100 with the carrier 204 of planetary gears 203 of output planetary gear train 200. Electric motor input shaft 31 is integrated with compound sun gear 101, while output gear shaft 50 is connected to the carrier 204 of output planetary gear train 200 by mechanical drive means 300 such as a simple gear pair, a timing belt, a chain-and-sprocket, or a simple planetary gear train.

Engine input shaft 21 is affixed to hub 151, which may in turn be operatively connected to the compound planetary gear train 10 by engaging either or both of multi-disk clutches 61 and 62. When clutch 61 is engaged, engine input shaft 21 is coupled to the planet carrier member 104 of input planetary gear train 100. Likewise, when clutch 62 is engaged, engine input shaft 21 is coupled to ring gear 202 of output planetary gear train 200 through hub 152. Band clutches 63 and 64 are used to ground ring gear 202 and sun gear 101 to the transmission case (not shown), and can be used to reduce the mobility of the transmission from two degree-of-freedom to one degree-of-freedom operation.

More particularly, thirteen useful operational modes are available from the parallel hybrid transmission of the instant invention using different combinations of the four clutches and operating the electric motor as either a motor or generator or allowing it to freewheel in the off condition. The thirteen useful modes of operation may be summarized by the following Table 1, and are discussed in greater detail below:

TABLE 1

Operational modes.

| | | Clutches Engaged | | | | Motor Operating |
| No. | Operation Mode | 61 | 62 | 63 | 64 | Condition |
| --- | --- | --- | --- | --- | --- | --- |
| 1 | Motor-only | | | X | | Motor |
| 2 | Engine & Motor 1 | X | | X | | Motor |
| 3 | Engine & Motor 2 | | X | | | Motor |
| 4 | Engine & Motor 3 | X | X | | | Motor |
| 5 | Continuous variable transmission/ Charging | X | | | | Generator |
| 6 | Engine-only 1 | X | | X | | Free Wheeling |
| 7 | Engine-only 2 | | X | | X | Stationary |
| 8 | Engine-only 3 | X | X | | | Free Wheeling |
| 9 | Engine-only 4 | X | | | X | Stationary |
| 10 | Regenerative Braking 1 | X | | X | | Generator |
| 11 | Regenerative Braking 2 | | X | | | Generator |
| 12 | Regenerative Braking 3 | X | X | | | Generator |
| 13 | Regenerative Braking 4 | | | X | | Generator |

Figure 2:
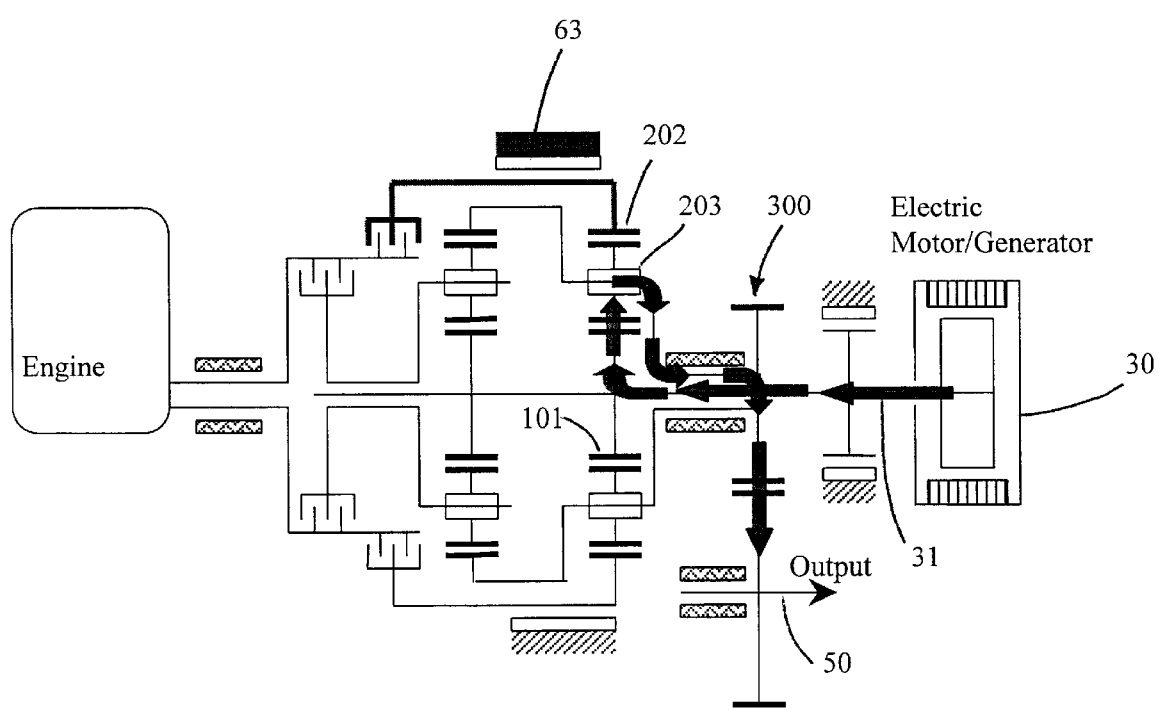
FIG. 2 is a schematic view of the motor-only mode of operation.

As shown in the schematic view of FIG. 2, the first mode of operation of the parallel hybrid transmission of the instant invention is motor-only mode in which the electric motor provides all of the power to drive the vehicle. The motor-only mode is used to initially move the vehicle from a standstill and for low speed driving in city traffic. Band clutch member 63 is the only clutch member engaged, grounding ring gear 202 and hub 152 to the transmission case. As a result, the transmission becomes a single degree-of-freedom transmission operable solely through the torque produced by electric motor 30. As shown in the arrows of FIG. 2, power is directed from electric motor 30 through electric motor drive shaft 31, sun gear 101, planetary gears 203 (and their carrier 204), mechanical drive means 300, and to output shaft 50. Ring gear 202 and hub 152 serve as a reaction member. In this operational mode, the input planetary gear train spins freely.

Another feature of the motor-only mode of operation of the transmission of the instant invention is that a vehicle operator may start engine 20 without an electric starter, as is traditionally required. When operating in motor-only mode, the vehicle operator need only engage clutch 63, and thus shift from the motor-only mode to the first combined engine and motor mode (shown in FIG. 3 and discussed in greater detail below), which process will in turn pull the engine up to operating speed as would a traditional, separate electric starter.

Figure 3:
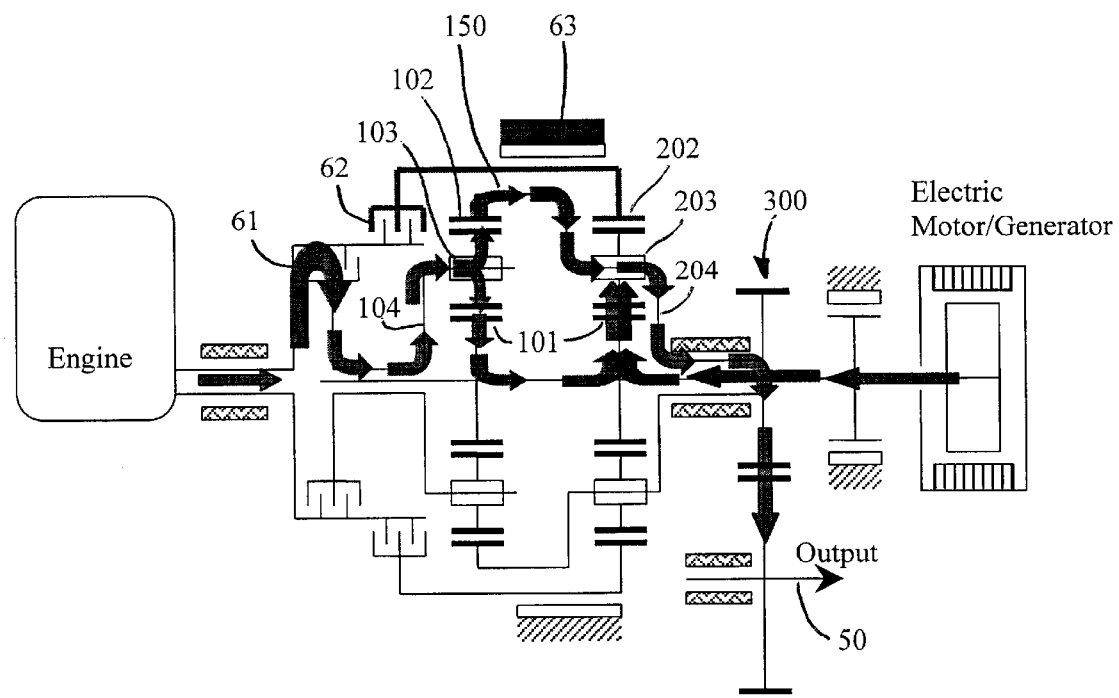
FIG. 3 is a schematic view of a first combined engine and motor mode of operation.
Figure 4:
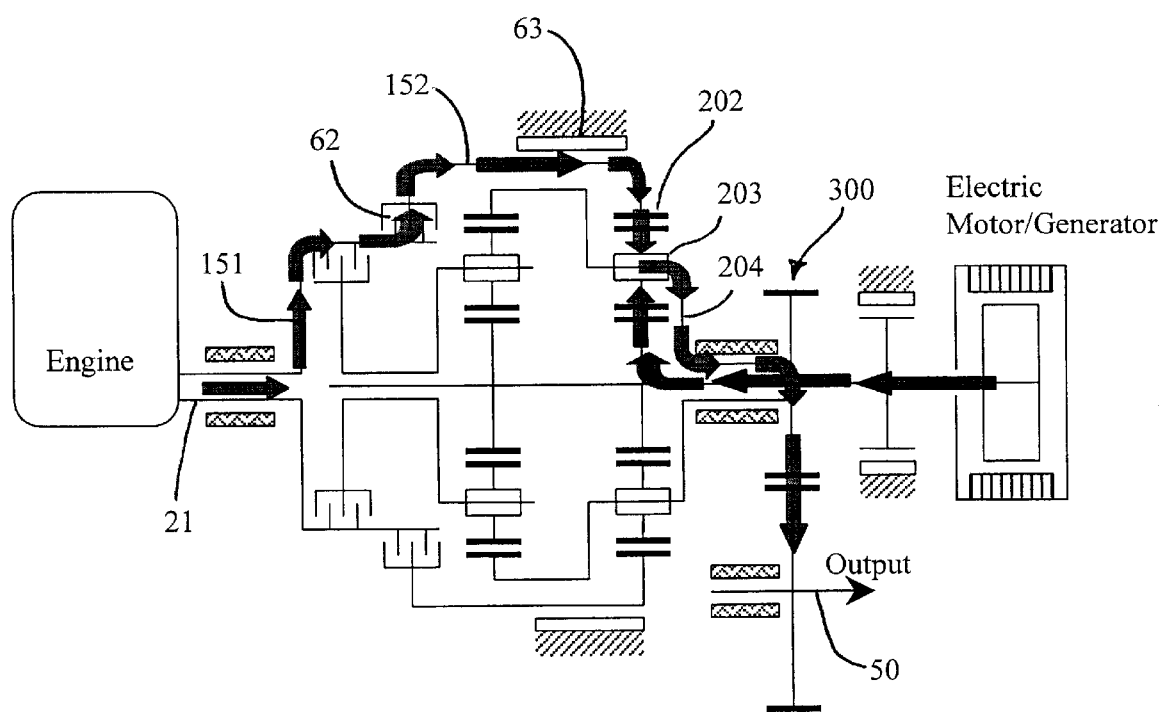
FIG. 4 is a schematic view of a second combined engine and motor mode of operation.
Figure 5:
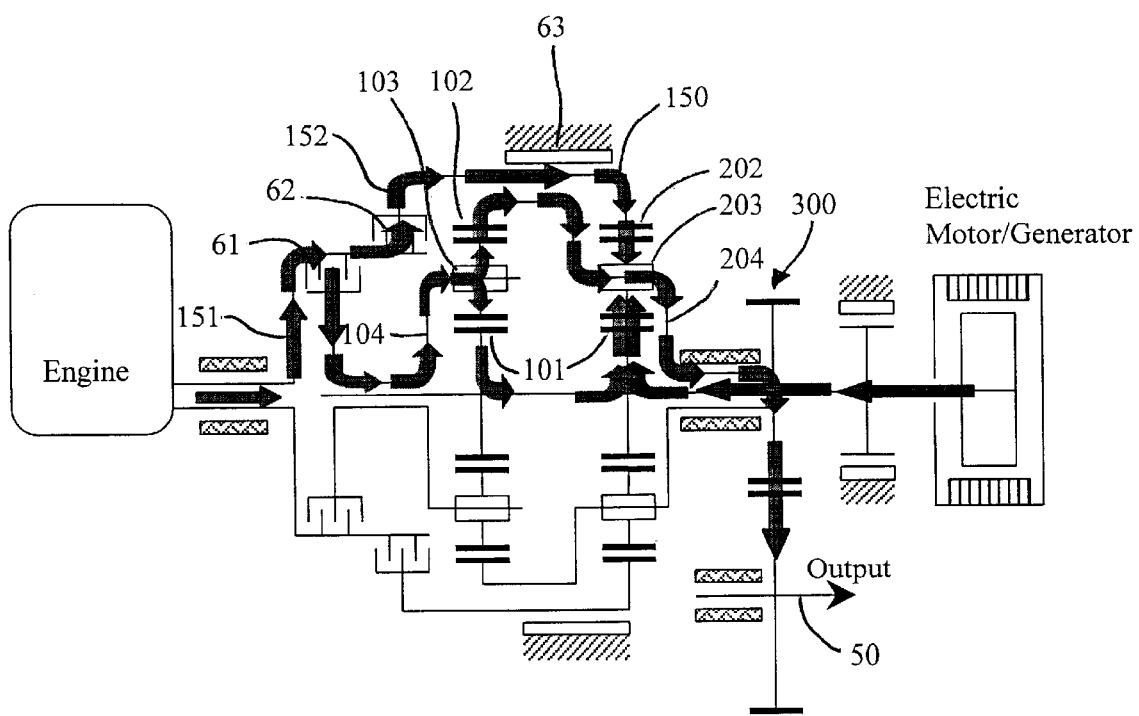
FIG. 5 is a schematic view of a third combined engine and motor mode of operation.

As shown in the schematic views of FIGS. 3 through 5, the next group of modes of operation of the parallel hybrid transmission of the instant invention is a combination mode which combines torque from the engine and motor to drive the vehicle. The combination mode depicted in FIGS. 3 through 5 is used for maximum acceleration or hill climbing. In the first combination mode (shown in FIG. 3), band clutch 63 and multi-disk clutch 61 are engaged, and all other clutches are disengaged. Ring gear 202 is grounded to the transmission case and serves as a reaction member. With multi-disk clutch 61 engaged, torque from the engine enters through carrier 104, input planetary gears 103, sun gear 101, ring gear 102, and through hub 150 to output carrier 204.

Likewise, torque from the motor enters through sun gear 101 to output planetary gears 203 and output carrier 204. Thus, the torque from the engine and motor are summed at the output planetary gear train planet carrier 204 and directed through mechanical drive means 300 to output shaft 50.

In the second combination mode (shown in FIG. 4), multi-disk clutch 62 is engaged and all others are disengaged. With clutch 62 engaged, torque from the engine enters from shaft 21 through hub 151, hub 152, and ring gear 202 to planetary gears 203, where it is summed with the motor torque and distributed through output planetary gear train carrier 204 and mechanical drive means 300 to output shaft 50. The transmission mechanism operates as a two-degree-of-freedom device. Given a particular vehicle speed, the engine can be operated at any desirable speed by adjusting the motor speed. This characteristic may be used to optimize performance with respect to engine thermal efficiency.

In the third combination mode (shown in FIG. 5), multi-disk clutches 61 and 62 are engaged and all other clutches are disengaged. Under this condition, the input and output planetary gear trains lock together and rotate as a single unit. Torque from the engine is transferred from hub 151 to both input planetary gear carrier 104 and hub 152. From planetary gear carrier 104, torque is transferred to planetary gears 103, and in turn to ring gear 102 and sun gear 101, and ultimately to output planetary gears 203. Torque from hub 152 is likewise transferred through ring gear 202 to planetary gears 203. Finally, motor torque is transferred through sun gear 101 to planetary gears 203. Summing these torque components, the total torque transferred to planetary gears 203 is in turn transferred to output planetary gear train carrier 204 and through mechanical drive means 300 to output shaft 50. Under this configuration, the engine and motor rotate at the same speed.

Figure 6:
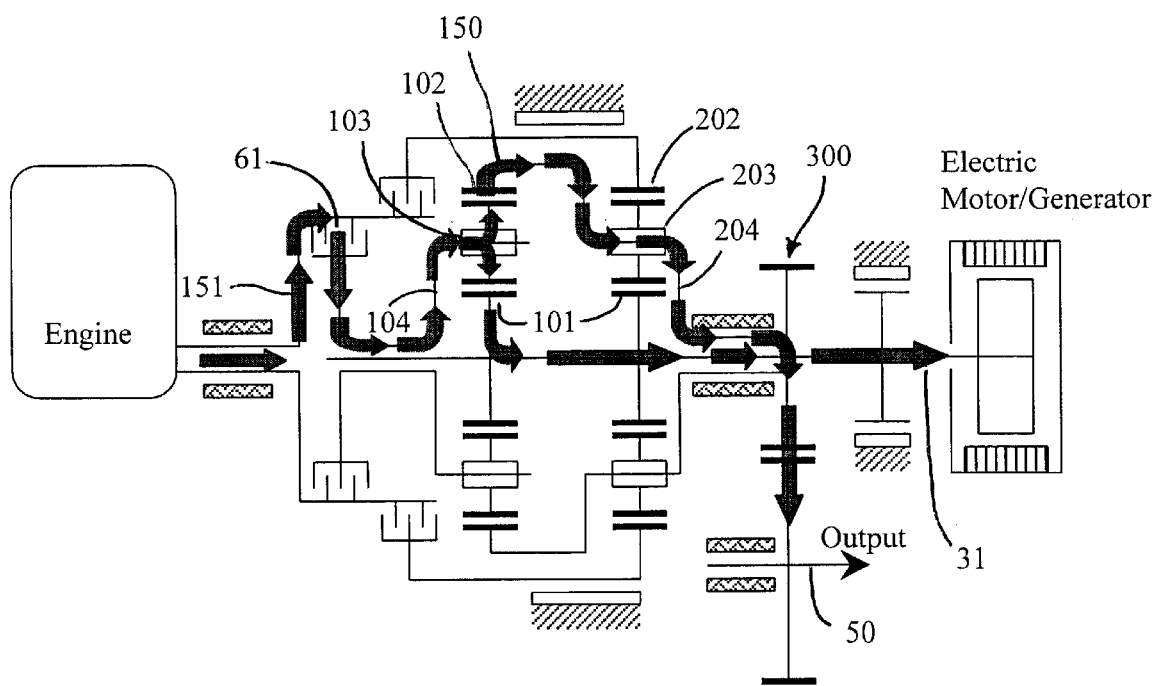
FIG. 6 is a schematic view of a continuous variable transmission and charging mode of operation.

As shown in the schematic views of FIG. 6, the next mode of operation of the parallel hybrid transmission of the instant invention is a continuous variable transmission/charging mode which enables power from the engine to be used to drive the vehicle and simultaneously charge the vehicle batteries when the battery state-of-charge is low and the power requirement for cruising is low. In this mode, multi-disk clutch 61 is engaged, and torque from the engine is transferred through hub 151 and input planetary gear train carrier 104 to input planetary gears 103, where the torque is split. Most of the torque is used to drive the vehicle as it is transferred from planetary gears 103 to ring gear 102, hub 150, and through output planetary gear train carrier 204, while the remainder is used to power the motor/generator for charging he batteries through sun gear 101 and motor drive shaft 31. For this operating mode, the motor is operated as a generator. For a given output shaft speed, the engine can be operated at a speed yielding peak efficiency while the vehicle speed is regulated by varying the speed of the generator. In this regard, the transmission functions as a continuous variable transmission.

As shown in the schematic views of FIGS. 7 through 10, the next group of modes of operation of the parallel hybrid transmission of the instant invention is engine-only modes which are utilized during highway cruising conditions in which it is highly desirable to power the vehicle directly from the heat engine with no power assist from the motor. The varying clutch arrangements made available by the configuration of the instant invention offer four distinct engine-only modes, namely, two reduction modes, one direct drive mode, and one overdrive gear ratio mode.

Figure 7:
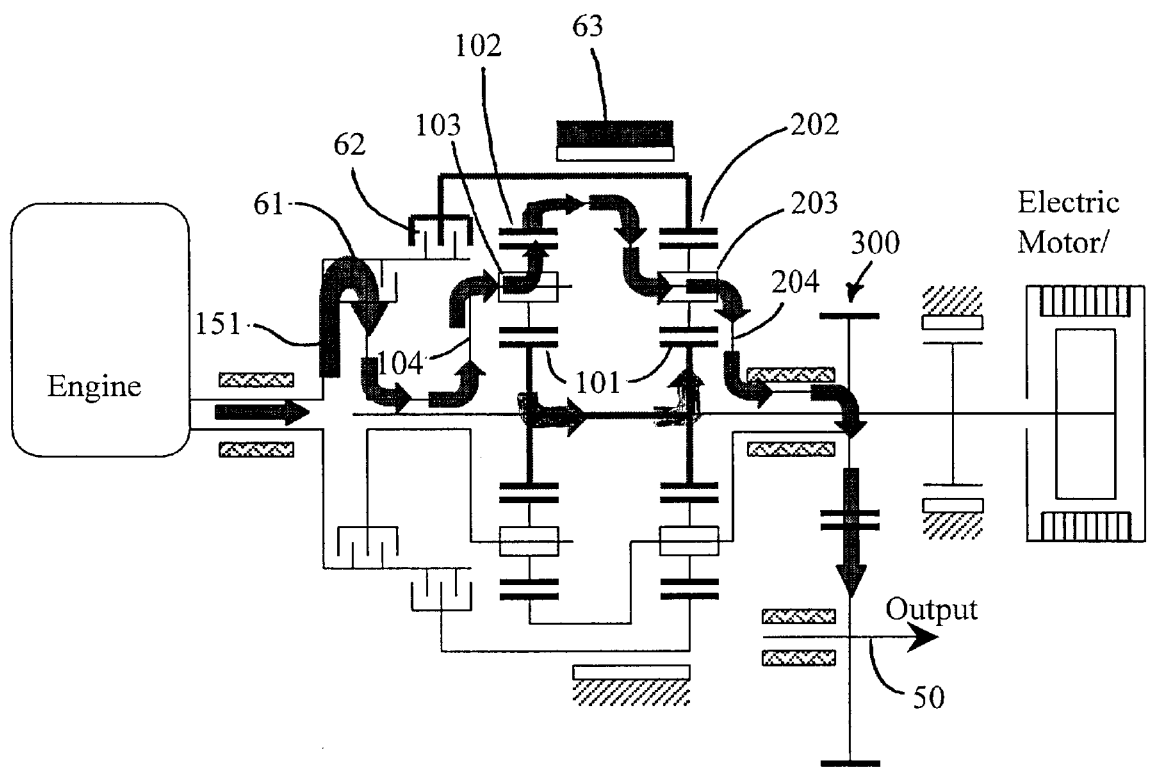
FIG. 7 is a schematic view of a first engine-only mode of operation.

The first reduction gear ratio mode is depicted in the schematic view of FIG. 7. Multi-disk clutch 61 and band clutch 63 are engaged, and the motor is free-wheeling in the off condition. With band clutch 63 engaged, ring gear 202 serves as a reaction member, and the input planetary gear train 100 and output planetary gear train 200 are coupled. The electric motor is switched to a neutral condition to allow sun gear 101 to spin freely. In this configuration, engine torque is transferred through hub 151, input planetary gear train carrier member 104, planetary gears 103, ring gear 102, and hub 150, and through sun gear 101 output planetary gears 203, to output planetary gear train carrier 204.

Figure 8:
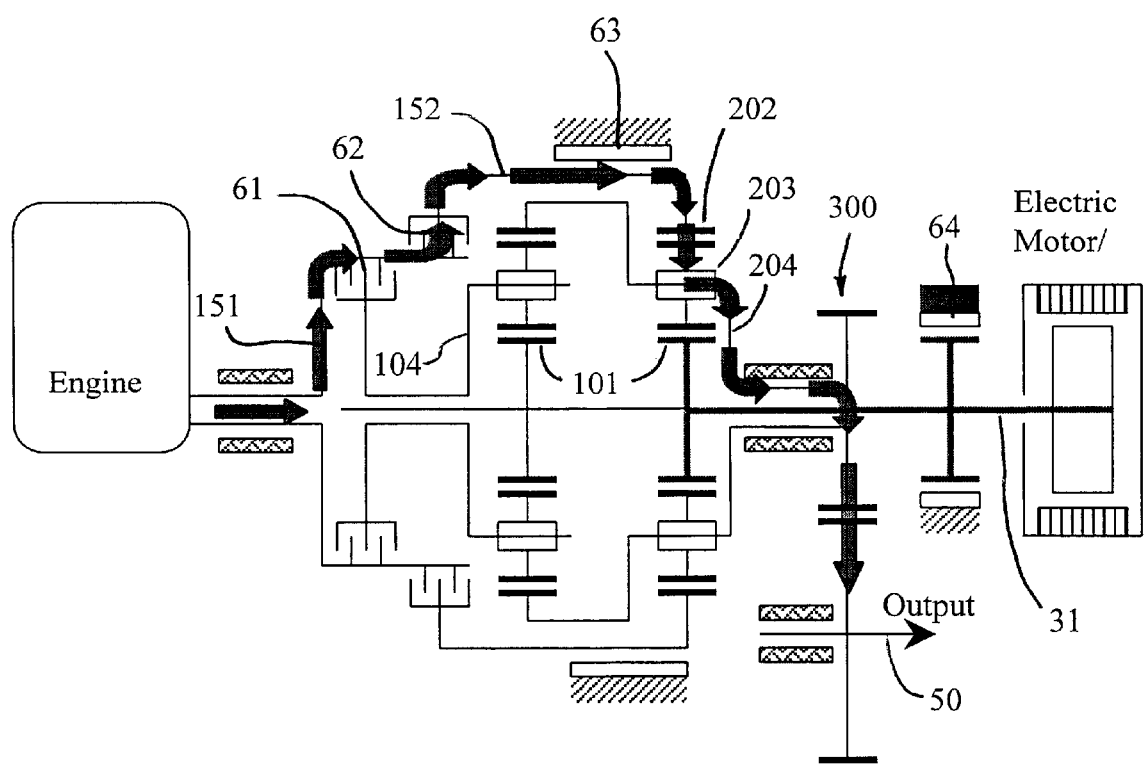
FIG. 8 is a schematic view of a second engine-only mode of operation.

The second reduction gear ratio mode is depicted in the schematic view of FIG. 8. Clutches 62 and 64 are engaged and all others are disengaged. In this condition, the motor shaft 31 is held fixed and sun gear 101 becomes the reaction member. The engine drives the vehicle by transferring torque through hub 151, hub 152, and ring gear 202 to planetary gears 203 and output planetary gear train carrier 204 at another reduction. A potential shortcoming of this mode is that the motor shaft must be stopped. If the motor inertia is fairly large, this transition may not be feasible.

Figure 9:
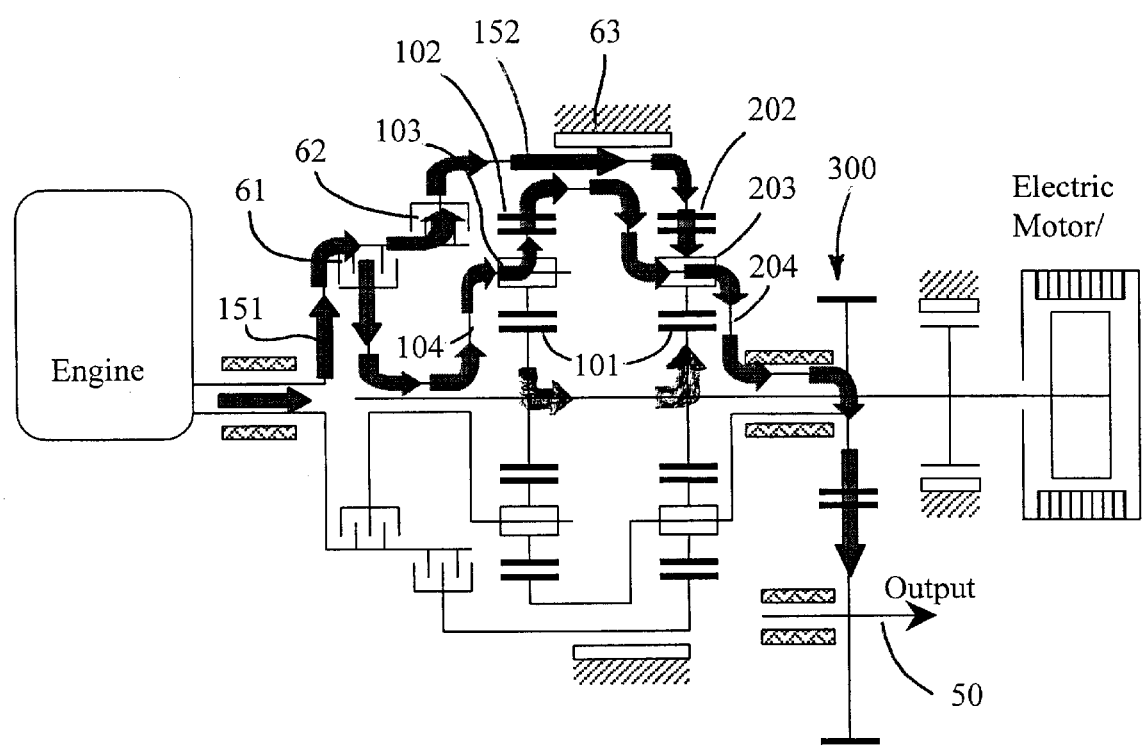
FIG. 9 is a schematic view of a third engine-only mode of operation.

The direct drive engine-only mode is depicted in FIG. 9. Multi-disk clutches 61 and 62 are engaged, and all remaining clutches are disengaged. The motor is allowed to freewheel in the off condition. In this configuration, torque from the engine is transmitted through hub 151 and is split, a portion of the torque being transferred through input planetary gear train carrier 104, input planetary gears 103, through ring gear 102 and hub 150, and through sun gear 101 and output planetary gears 203, while the remainder of the torque is transferred through hub 152 and ring gear 202 to output planetary gears 203, where the torques are again combined and transferred through output planetary gear train carrier 204 and mechanical drive means 300 to output shaft 50.

Figure 10:
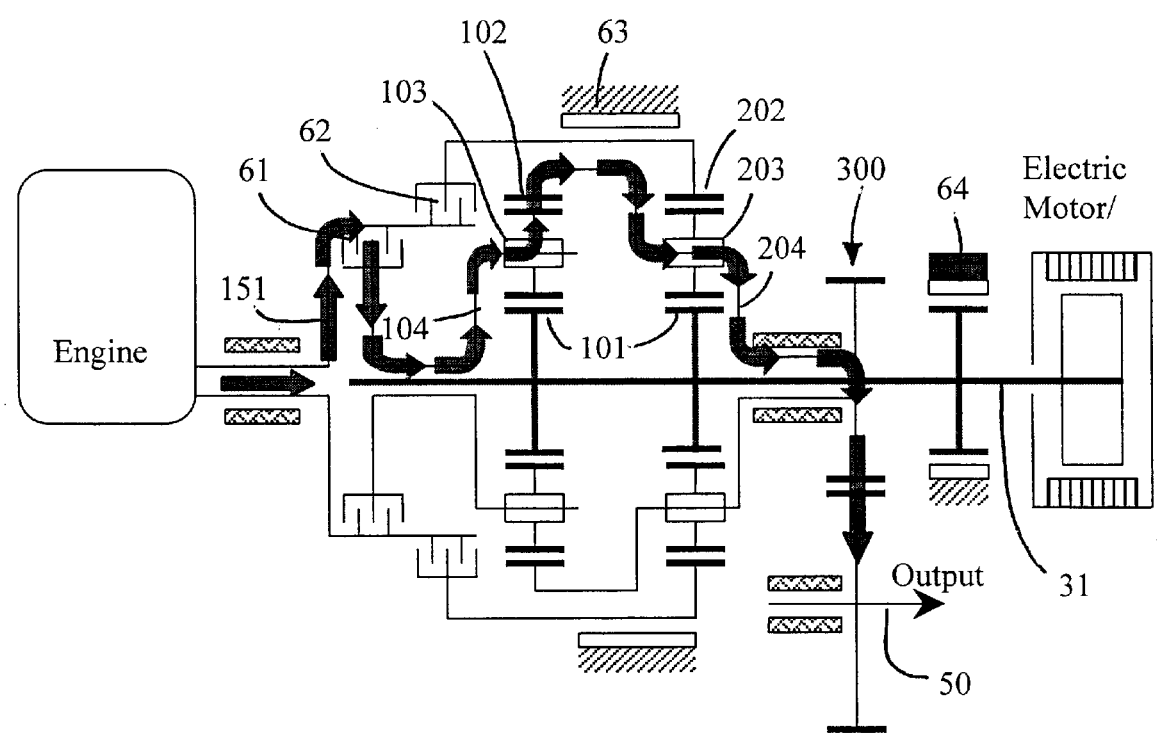
FIG. 10 is a schematic view of a fourth engine-only mode of operation.

The overdrive engine-only mode is likewise depicted in FIG. 10. Multi-disk clutch 61 and band clutch 64 are engaged, and all other clutches are disengaged. Prevented from rotating due to band clutch 64, sun gear 101 becomes the reaction member, and the output planetary gear train carries no load. Engine torque is transferred through hub 151, input planetary gear train carrier 104, planetary gears 103, ring gear 102, and hub 150 to output planetary gear train carrier 204, and through mechanical drive means 300 to output shaft 50. This mode is also complicated by the potential shortcoming associated with the inertia of the motor as motor shaft 31 is stopped.

As indicated in Table 1 above, four regenerative braking modes are also made available through the parallel hybrid transmission of the instant invention. During braking events, the electric motor is operated as a generator to charge the batteries. The output shaft becomes an input shaft, and kinetic energy of the vehicle that would otherwise have been lost through the brakes is stored for later use.

The first regenerative braking mode is identical to the clutch condition in combination mode 1 (shown in FIG. 3), except that the motor is operated as a generator. Since the engine is coupled to the output shaft through the mechanism, both the generator and engine provide braking torque. The power flow is the reverse of that shown in FIG. 3.

The second regenerative braking mode is identical to the clutch condition in combination mode 2 (shown in FIG. 4), except that the motor is operated as a generator. Again, both the engine and the generator provide braking torque. The power flow is the reverse of that shown in FIG. 4. Since the speed of the motor can be chosen arbitrarily, the operating condition can be optimized for maximum regeneration of power.

The third regenerative braking mode is identical to the clutch condition in combination mode 3 (shown in FIG. 5), except that the motor is once again operated as a generator. Again, both the engine and generator provide braking torque. The power flow is the reverse of that shown in FIG. 5.

Finally, the fourth regenerative braking mode is identical to the motor-only mode (shown in FIG. 2), except that the motor is operated as a generator. In this condition, only the generator provides braking torque. Therefore, this mode results in the most effective recovery of vehicle kinetic energy. The power flow is the reverse of that shown in FIG. 2.

Alternative similar hybrid transmission mechanisms may also be provided. In general, a hybrid transmission is preferably comprised of two basic planetary gear trains: one for summing the power of an engine and an electric motor/generator to drive the vehicle, and the other for splitting the engine power into two parts for driving the vehicle and charging the batteries.

Figure 11:
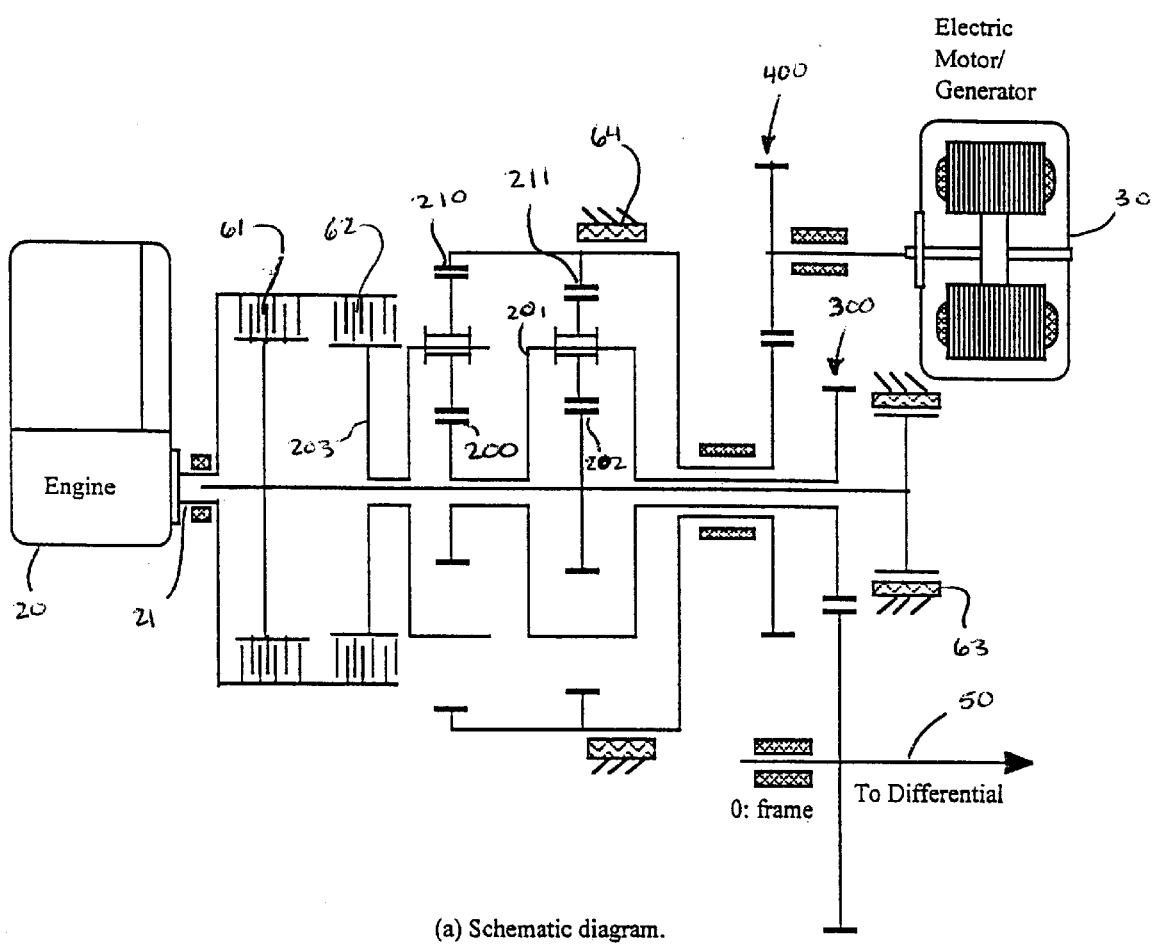
FIG. 11 is a schematic view of a first alternate embodiment of the parallel hybrid electric vehicle of the instant invention.

FIG. 11 shows an alternative configuration in which the input sun gear 200 is connected to the output carrier 201 which is in turn connected to a final reduction gear pair (shown generally at 300) for driving output shaft 50. Once again, gear pair 300 may alternately be configured as a belt drive, a chain drive, or similarly configured drive means. The two ring gears 210 and 211 are connected together and to the electric motor/generator via a gear pair (shown generally at 400), which likewise may be alternately configured as a belt drive, a chain drive, or similarly configured direct drive means. Both ring gears 210 and 211 and, therefore, the electric motor 30 can be grounded by a band clutch 64. The engine crankshaft 21 can be connected either to the output sun gear 202 by a rotating clutch 61 or to the input carrier 203 by another rotating clutch 62. The output sun gear 202 can also be grounded by a band clutch 63. The corresponding clutching sequence is given in Table 2 as follows:

TABLE 2

Operational modes.

| | | Clutches Engaged | | | |
|---|---|---|---|---|---|
| No. | Operation Mode | 61 | 62 | 63 | 64 |
| 1 | Electric Motor | | | | X |
| 2 | Engine & Motor | X | | | |
| 3 | Continuous variable transmission/ Charging | | X | | |
| 4 | Engine | | X | | X |
| 5 | Regenerative Braking | | | X | |

Figure 12:
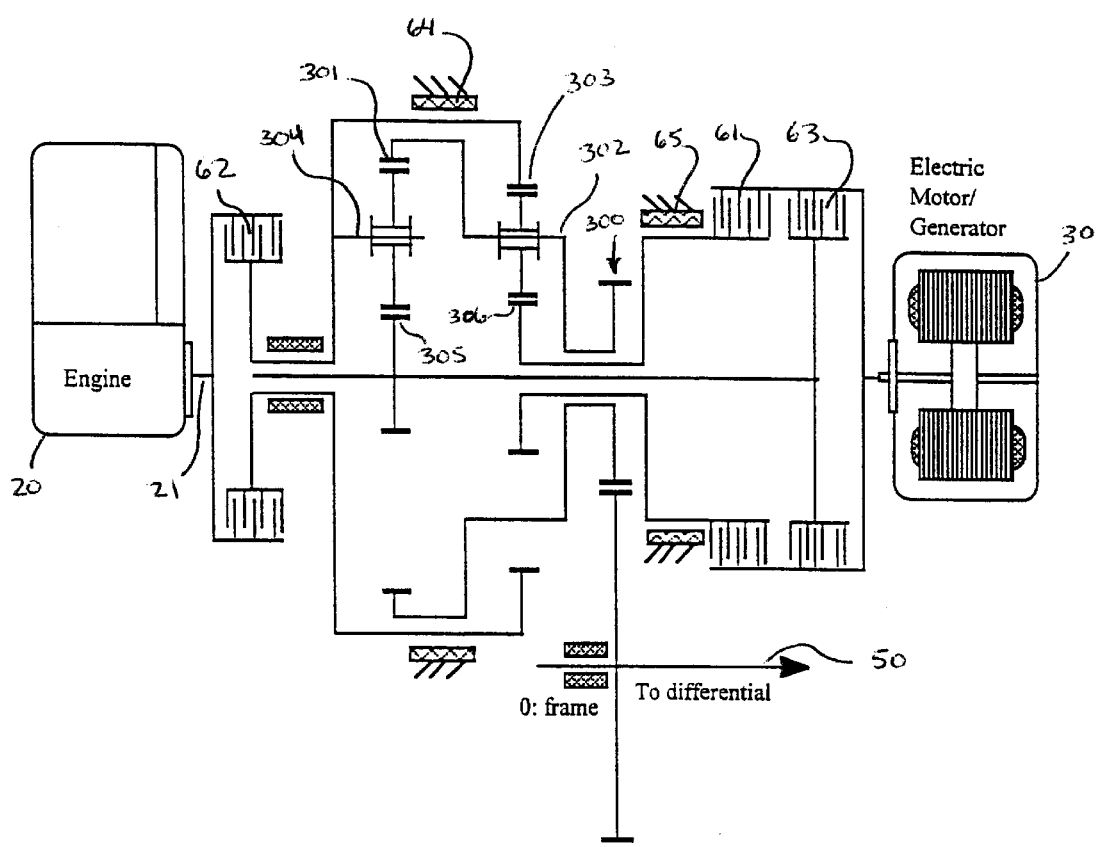
FIG. 12 is a schematic view of a second alternate embodiment of the parallel hybrid electric vehicle of the instant invention.

FIG. 12 shows another configuration in which the input ring gear 301 is connected to the output carrier 302 which is in turn connected to a final reduction gear pair (shown generally at 300) for driving output shaft 50. Yet again, gear pair 300 may alternately be configured as a belt drive, a chain drive, or similarly configured direct drive means. Furthermore, the output ring gear 303 is connected to the input carrier 304 which can be connected to the engine crankshaft 21 by a rotating clutch 62 or be grounded by a band clutch 64. Each sun gear 305 and 306 can be connected to the electric motor/generator 30 by a rotating clutch 61 or 63. The output sun gear 306 can also be grounded by a band clutch 65. The corresponding clutching sequence is given in Table 3 as follows:

TABLE 3

Operational modes.

| | | Clutches Engaged | | | | |
|---|---|---|---|---|---|---|
| No. | Operation Mode | 61 | 62 | 63 | 64 | 65 |
| 1 | Electric Motor | X | | | X | |
| 2 | Engine & Motor | X | X | | | |
| 3 | Continuous variable transmission/ Charging | | X | X | | |
| 4 | Engine | | X | | | X |
| 5 | Regenerative Braking | X | | | X | |

Figure 13:
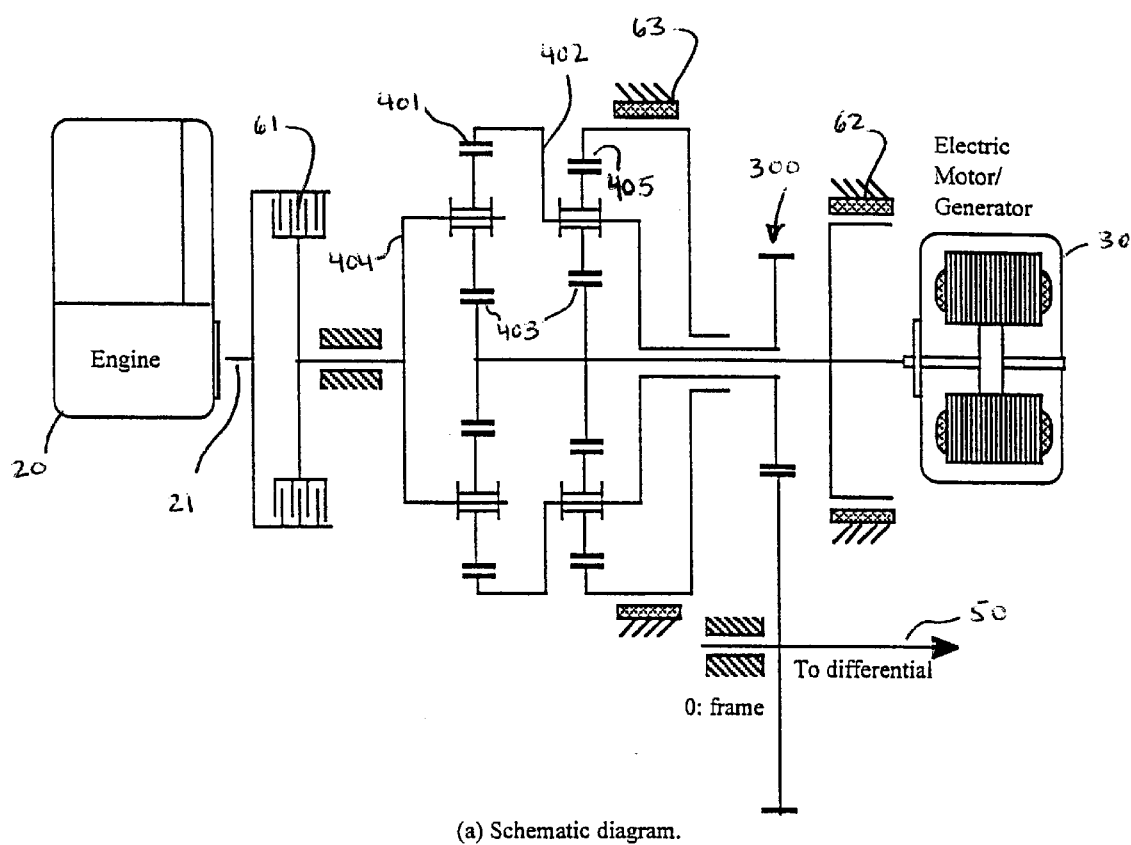
FIG. 13 is a schematic view of a third alternate embodiment of the parallel hybrid electric vehicle of the instant invention.

FIG. 13 shows yet another configuration in which the input ring gear 401 is connected to the output carrier 402 which is in turn connected to a final reduction gear pair (shown generally at 300) for driving output shaft 50. Still yet again, gear pair 300 may alternately be configured as a belt drive, a chain drive, or similarly configured direct drive means. The two sun gears 403 are connected to each other and to the electric motor/generator 30. The electric motor/generator can also be grounded by a band clutch 62. The engine crankshaft 21 can be connected to the input carrier by a rotating clutch 61. The output ring gear 405 can be free wheeling or grounded by a band clutch 63. The corresponding clutching sequence is given in Table 4 as follows:

TABLE 4

Operational modes.

| | | Clutches Engaged | | |
|---|---|---|---|---|
| No. | Operation Mode | 61 | 62 | 63 |
| 1 | Electric Motor | | | X |
| 2 | Engine & Motor | X | | X |
| 3 | Continuous variable transmission/ Charging | | X | |
| 4 | Engine | X | X | |
| 5 | Regenerative Braking | | | X |

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A transmission comprising:
an engine having an engine drive shaft;
an electric driving mechanism selectively operable as an electric motor and as a generator, said electric driving mechanism having a motor drive shaft;
an electric energy storage means in electrical communication with said electric driving mechanism;
a compound planetary gear set, said compound planetary gear set further comprising an input planetary gear train having a plurality of input gear train members, and an output planetary gear train having a plurality of output gear train members;
an output shaft operatively connected to said compound planetary gear set;
a first clutch positioned to selectively operatively connect said engine drive shaft to a first input gear train member;
a second clutch positioned to selectively operatively connect said engine drive shaft to a first output gear train member;
a third clutch positioned to selectively operatively connect said first output gear train member to a transmission case; and
a fourth clutch positioned to selectively operatively connect said motor drive shaft and one of each of said input gear train members and said output gear train members to said transmission case;
said first input gear train member comprising an input planetary gear carrier operatively connected to a plurality of input planetary gears, said input gear train member further comprising an input sun gear and an input ring gear, each of said input sun gear and said input ring gear engaging said plurality of input planetary gears; and
said first output gear train member comprising an output ring gear, said output gear train members further comprising an output sun gear and a plurality of output planetary gears engaging said output sun gear and said output ring gear and being operatively connected to an output planetary gear carrier.

2. The transmission of claim 1, wherein said input sun gear is conjoined with said output sun gear, and said input ring gear is conjoined with said output planetary gear carrier.

3. The transmission of claim 2, wherein said output planetary gear carrier is further fixedly attached to an intermediate mechanical drive means positioned between said output planetary gear carrier and said output shaft.

4. The transmission of claim 1, wherein engaging said third clutch and disengaging said first, second, and fourth clutches, and operating said electric driving mechanism as an electric motor, transfers torque only from said electric driving mechanism to said output shaft.

5. The transmission of claim 1, wherein engaging said first and third clutches and disengaging said second and fourth clutches, and operating said electric driving mechanism as an electric motor, transfers torque from said engine and said electric driving mechanism to said output shaft.

6. The transmission of claim 1, wherein engaging said second clutch and disengaging said first, third, and fourth clutches, and operating said electric driving mechanism as an electric motor, transfers torque from said engine and said electric driving mechanism to said output shaft.

7. The transmission of claim 1, wherein engaging said first and second clutches and disengaging said third and fourth clutches, and operating said electric driving mechanism as an electric motor, transfers torque from said engine and said electric driving mechanism to said output shaft.

8. The transmission of claim 1, wherein engaging said first clutch and disengaging said second, third, and fourth clutches, and operating said electric driving mechanism as a generator, transfers torque from said engine to said output shaft and said electric driving mechanism.

9. The transmission of claim 1, wherein engaging said first and third clutches and disengaging said second and fourth clutches, and not driving said electric driving mechanism, transfers torque only from said engine to said output shaft.

10. The transmission of claim 1, wherein engaging said second and fourth clutches and disengaging said first and third clutches transfers torque only from said engine to said output shaft.

11. The transmission of claim 1, wherein engaging said first and second clutches and disengaging said third and fourth clutches, and not driving said electric driving mechanism, transfers torque only from said engine to said output shaft.

12. The transmission of claim 1, wherein engaging said first and fourth clutches and disengaging said second and third clutches transfers torque only from said engine to said output shaft.

13. The transmission of claim 1, wherein engaging said first and third clutches and disengaging said second and fourth clutches, and operating said electric driving mechanism as a generator, transfers torque from said output shaft to said engine and said electric driving mechanism.

14. The transmission of claim 1, wherein engaging said second clutch and disengaging said first, third, and fourth clutches, and operating said electric driving mechanism as a generator, transfers torque from said output shaft to said engine and said electric driving mechanism.

15. The transmission of claim 1, wherein engaging said first and second clutches and disengaging said third and fourth clutches, and operating said electric driving mechanism as a generator, transfers torque from said output shaft to said engine and said electric driving mechanism.

16. The transmission of claim 1, wherein engaging said third clutch and disengaging said first, second, and fourth clutches, and operating said electric driving mechanism as a generator, transfers torque from said output shaft only to said electric driving mechanism.

17. A transmission comprising:
an engine having an engine drive shaft;
an electric driving mechanism selectively operable as an electric motor and as a generator, said electric driving mechanism having a motor drive shaft;
an electric energy storage device in electrical communication with said electric driving mechanism;
a compound planetary gear set, said compound planetary gear set further comprising an input planetary gear train having a plurality of input gear train members, and an output planetary gear train having a plurality of output gear train members;
an output shaft operatively connected to said compound planetary gear set;
a first torque transfer device positioned to selectively operatively connect said engine drive shaft to a first input gear train member;
a second torque transfer device positioned to selectively operatively connect said engine drive shaft to a first output gear train member;
a third torque transfer device positioned to selectively operatively connect said first output gear train member to a transmission case; and
a fourth torque transfer device positioned to selectively operatively connect said motor drive shaft and one of each of said input gear train members and said output gear train members to said transmission case;
wherein said first input gear train member comprises an input planetary gear carrier operatively connected to a plurality of input planetary gears, said input gear train members further comprising an input sun gear and an input ring gear, each of said input sun gear and said input ring gear engaging said plurality of input planetary gears, and said first output gear train member comprising an output ring gear, said output gear train members further comprising an output sun gear and a plurality of output planetary gears engaging said output sun gear and said output ring gear and being operatively connected to an output planetary gear carrier.

18. The transmission of claim 17, wherein said input sun gear is conjoined with said output sun gear, and said input ring gear is conjoined with said output planetary gear carrier.

19. The transmission of claim 18, wherein said output planetary gear carrier is further fixedly attached to an intermediate mechanical drive means positioned between said output planetary gear carrier and said output shaft.

20. The transmission of claim 17, wherein engaging said third clutch and disengaging said first, second, and fourth clutches, and operating said electric driving mechanism as an electric motor, transfers torque only from said electric driving mechanism to said output shaft.

21. The transmission of claim 17, wherein engaging said first and third clutches and disengaging said second and fourth clutches, and operating said electric driving mechanism as an electric motor, transfers torque from said engine and said electric driving mechanism to said output shaft.

22. The transmission of claim 17, wherein engaging said second clutch and disengaging said first, third, and fourth clutches, and operating said electric driving mechanism as an electric motor, transfers torque from said engine and said electric driving mechanism to said output shaft.

23. The transmission of claim 17, wherein engaging said first and second clutches and disengaging said third and fourth clutches, and operating said electric driving mechanism as an electric motor, transfers torque from said engine and said electric driving mechanism to said output shaft.

24. The transmission of claim 17, wherein engaging said first clutch and disengaging said second, third, and fourth clutches, and operating said electric driving mechanism as a generator, transfers torque from said engine to said output shaft and said electric driving mechanism.

25. The transmission of claim 17, wherein engaging said first and third clutches and disengaging said second and fourth clutches, and not driving said electric driving mechanism, transfers torque only from said engine to said output shaft.

26. The transmission of claim 17, wherein engaging said second and fourth clutches and disengaging said first and third clutches transfers torque only from said engine to said output shaft.

27. The transmission of claim 17, wherein engaging said first and second clutches and disengaging said third and fourth clutches, and not driving said electric driving mechanism, transfers torque only from said engine to said output shaft.

28. The transmission of claim 17, wherein engaging said first and fourth clutches and disengaging said second and third clutches transfers torque only from said engine to said output shaft.

29. The transmission of claim 17, wherein engaging said first and third clutches and disengaging said second and fourth clutches, and operating said electric driving mechanism as a generator, transfers torque from said output shaft to said engine and said electric driving mechanism.

30. The transmission of claim 17, wherein engaging said second clutch and disengaging said first, third, and fourth clutches, and operating said electric driving mechanism as a generator, transfers torque from said output shaft to said engine and said electric driving mechanism.

31. The transmission of claim 17, wherein engaging said first and second clutches and disengaging said third and fourth clutches, and operating said electric driving mechanism as a generator, transfers torque from said output shaft to said engine and said electric driving mechanism.

32. The transmission of claim 17, wherein engaging said third clutch and disengaging said first, second, and fourth clutches, and operating said electric driving mechanism as a generator, transfers torque from said output shaft only to said electric driving mechanism.

33. A transmission comprising:
 a transmission case;
 a first power source;
 a second power source;
 an electrical energy storage device in electrical communication with said second power source;
 a compound planetary gear set;
 an output shaft operatively connected to said compound planetary gear set; and
 a plurality of torque transfer devices for selectively operatively connecting said first power source to said compound planetary gear set, and for connecting said second power source and at least a portion of said planetary gear set to said transmission case, said plurality of torque transfer devices being simultaneously operable to selectively: (i) sum torque from said first and second power sources and transfer said summed torque to said output shaft; (ii) split torque from said first power source to simultaneously transfer a first portion of said split torque to said output shaft and a second portion of said split torque to said second power source; and (iii) transmit torque from only a single one of said first and second power sources to said output shaft;
 said compound planetary gear set further comprising:
  an input planetary gear train having a plurality of input gear train members, said
  input gear train members further comprising:
   an input sun gear, an input ring gear, and a plurality of input planetary gears engaging said input sun gear and said input ring gear and being operatively connected to an input planetary gear carrier; and
  an output planetary gear train having a plurality of output gear train members, said output gear train members further comprising:
   an output sun gear, an output ring gear, and a plurality of output planetary gears engaging said output sun gear and said output ring gear and being operatively connected to an output planetary gear carrier;
  wherein said input sun gear is conjoined with said output sun gear, and said input ring gear is conjoined with said output planetary gear carrier.

34. The transmission of claim 33, wherein said output planetary gear carrier is further fixedly attached to an intermediate mechanical drive positioned between said output planetary gear carrier and said output shaft.

35. The transmission of claim 33, said first power source further comprising a first drive shaft, and said second power source further comprising a second drive shaft, wherein:
 said first drive shaft is selectively operatively attached to said input planetary gear carrier, said output ring gear, and both said input planetary gear carrier and said output ring gear simultaneously;
 said input sun gear and said output sun gear are fixedly attached to said second drive shaft; and
 said output planetary gear carrier is operatively attached to said output shaft.

36. The transmission of claim 33, said first power source further comprising a first drive shaft, said second power source further comprising a second drive shaft, and said plurality of torque transfer devices further comprising:
 a first clutch selectively operatively connecting said first drive shaft to said input planetary gear carrier;
 a second clutch selectively operatively connecting said first drive shaft to said output ring gear;
 a third clutch selectively operatively connecting said output ring gear to a transmission case; and
 a fourth clutch selectively operatively connecting said second drive shaft, said input sun gear, and said output sun gear to said transmission case.

37. The transmission of claim 36, wherein said third and fourth clutches comprise band clutches.

38. The transmission of claim 33, wherein said first power source comprises a heat engine, and said second power source comprises a combined electric motor and generator.

39. The transmission of claim 38, said plurality of torque transfer devices being further simultaneously operable to selectively transfer torque from said electric motor and said output shaft to said heat engine when said heat engine is in a nonoperational state in order to start operation of said heat engine.

40. A transmission comprising:
 a transmission case;
 a first power source;
 a second power source;
 an electrical energy storage device in electrical communication with said second power source;
 a compound planetary gear set;
 an output shaft operatively connected to said compound planetary gear set; and
 a plurality of torque transfer devices for selectively operatively connecting said first power source to said compound planetary gear set, and for connecting said second power source and at least a portion of said planetary gear set to said transmission case, said plurality of torque transfer devices being simultaneously operable to selectively: (i) transfer torque only from said first power source to said output shaft; (ii) transfer torque only from said second power source to said output shaft; (iii) transfer combined torque from each of said first and second power sources to said output shaft; (iv) function simultaneously as a continuous variable transmission and charger for said electrical energy storage device; (v) transfer torque from said output shaft to said second power source to direct electrical energy from said second power source to said electrical energy storage device; (vi) transfer torque from said output shaft to said first power source to provide engine braking; and (vii) transfer torque to said first and second power sources simultaneously;
 said compound planetary gear set further comprising:
  an input planetary gear train having a plurality of input gear train members, said
  input gear train members further comprising:
   an input sun gear, an input ring gear, and a plurality of input planetary gears engaging said input sun gear and said input ring gear and being operatively connected to an input planetary gear carrier; and
  an output planetary gear train having a plurality of output gear train members, said output gear train members further comprising:

an output sun gear, an output ring gear, and a plurality of output planetary gears engaging said output sun gear and said output ring gear and being operatively connected to an output planetary gear carrier;

wherein said input sun gear is conjoined with said output sun gear, and said input ring gear is conjoined with said output planetary gear carrier.

41. The transmission of claim 40, wherein said output planetary gear carrier is further fixedly attached to an intermediate mechanical drive positioned between said output planetary gear carrier and said output shaft.

42. The transmission of claim 40, said first power source further comprising a first drive shaft, and said second power source further comprising a second drive shaft, wherein:

said first drive shaft is selectively operatively attached to said input planetary gear carrier, said output ring gear, and both said input planetary gear carrier and said output ring gear simultaneously;

said input sun gear and said output sun gear are fixedly attached to said second drive shaft; and said output planetary gear carrier is operatively attached to said output shaft.

43. The transmission of claim 40, said first power source further comprising a first drive shaft, said second power source further comprising a second drive shaft, and said means for selectively and operatively connecting said first and second power sources to said compound gear set further comprising:

a first clutch selectively operatively connecting said first drive shaft to said input planetary gear carrier;

a second clutch selectively operatively connecting said first drive shaft to said output ring gear;

a third clutch selectively operatively connecting said output ring gear to a transmission case; and a fourth clutch selectively operatively connecting said second drive shaft to said transmission case.

44. The transmission of claim 43, wherein said third and fourth clutches comprise band clutches.

45. The transmission of claim 40, wherein said first power source comprises a heat engine, and said second power source comprises a combined electric motor and generator.

46. The transmission of claim 45, said plurality of torque transfer devices being simultaneously operable to selectively transfer torque from said electric motor and said output shaft to said heat engine when said heat engine is in a nonoperational state in order to start operation of said heat engine.

47. The transmission of claim 46, said plurality of torque transfer devices being simultaneously operable to selectively transfer torque from said electric motor and said output shaft to said heat engine when said heat engine is in a nonoperational state in order to start operation of said heat engine.

* * * * *